US010592279B2

(12) United States Patent
Basu et al.

(10) Patent No.: US 10,592,279 B2
(45) Date of Patent: Mar. 17, 2020

(54) MULTI-PROCESSOR APPARATUS AND METHOD OF DETECTION AND ACCELERATION OF LAGGING TASKS

(71) Applicant: Advanced Micro Devices, Inc., Sunnyvale, CA (US)

(72) Inventors: Arkaprava Basu, Austin, TX (US); Dmitri Yudanov, Austin, TX (US); David A. Roberts, Boxborough, MA (US); Mitesh R. Meswani, Austin, TX (US); Sergey Blagodurov, Bellevue, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 72 days.

(21) Appl. No.: 15/191,355

(22) Filed: Jun. 23, 2016

(65) Prior Publication Data

US 2017/0371720 A1   Dec. 28, 2017

(51) Int. Cl.
*G06F 9/52* (2006.01)
*G06F 9/48* (2006.01)
*G06F 11/34* (2006.01)
*G06F 9/50* (2006.01)

(52) U.S. Cl.
CPC ........ *G06F 9/4881* (2013.01); *G06F 11/3466* (2013.01); *G06F 9/4843* (2013.01); *G06F 9/5044* (2013.01); *G06F 9/5088* (2013.01); *G06F 9/52* (2013.01); *G06F 11/3452* (2013.01); *G06F 2209/509* (2013.01)

(58) Field of Classification Search
None
See application file for complete search history.

(56) References Cited

U.S. PATENT DOCUMENTS

| 6,651,082 | B1 * | 11/2003 | Kawase | ........ G06F 9/5083 718/105 |
| 6,665,716 | B1 * | 12/2003 | Hirata | ........ G06F 11/3409 709/223 |
| 7,536,689 | B2 * | 5/2009 | Mangan | ........ G06F 9/4881 718/100 |

(Continued)

FOREIGN PATENT DOCUMENTS

WO    WO-2017065629 A1 *   4/2017

OTHER PUBLICATIONS

Chronaki et al, Criticality-Aware Dynamic Task Scheduling for Heterogeneous Architectures, 2015, ACM, ICS'15, pp. 329-338 (Year: 2015).*

(Continued)

*Primary Examiner* — Abu Zar Ghaffari
(74) *Attorney, Agent, or Firm* — Volpe and Koenig, P.C.

(57) ABSTRACT

A method and processing apparatus for accelerating program processing is provided that includes a plurality of processors configured to process a plurality of tasks of a program and a controller. The controller is configured to determine, from the plurality of tasks being processed by the plurality of processors, a task being processed on a first processor to be a lagging task causing a delay in execution of one or more other tasks of the plurality of tasks. The controller is further configured to provide the determined lagging task to a second processor to be executed by the second processor to accelerate execution of the lagging task.

16 Claims, 5 Drawing Sheets

(56) References Cited

U.S. PATENT DOCUMENTS

| | | | | |
|---|---|---|---|---|
| 7,953,113 B2* | 5/2011 | Elliot | H04L 47/10 | 370/230 |
| 8,171,481 B2* | 5/2012 | Benedetti | G06F 9/5044 | 718/104 |
| 8,589,660 B2* | 11/2013 | Plunkett | G06F 15/7867 | 712/15 |
| 9,141,430 B2* | 9/2015 | Cherkasova | G06F 9/5038 | |
| 9,336,115 B1* | 5/2016 | Bienkowski | G06F 11/3409 | |
| 9,483,321 B2* | 11/2016 | Xu | G06F 9/4881 | |
| 9,552,223 B2* | 1/2017 | Fontenot | G06F 9/4843 | |
| 9,632,822 B2* | 4/2017 | Chang | G06F 9/4843 | |
| 2005/0108715 A1* | 5/2005 | Kanai | G06F 9/4881 | 718/100 |
| 2006/0186571 A1* | 8/2006 | Brown | C08G 18/0895 | 264/166 |
| 2007/0038987 A1* | 2/2007 | Ohara | G06F 8/45 | 717/151 |
| 2007/0061783 A1* | 3/2007 | Prakash | G06F 9/505 | 717/127 |
| 2007/0283358 A1* | 12/2007 | Kasahara | G06F 9/5044 | 718/104 |
| 2008/0066066 A1* | 3/2008 | MacPherson | G06F 9/5027 | 718/100 |
| 2008/0120625 A1* | 5/2008 | Clark | G06F 15/173 | 719/317 |
| 2009/0064119 A1* | 3/2009 | Archambault | G06F 8/4441 | 717/160 |
| 2009/0106539 A1* | 4/2009 | Mericas | G06F 11/3409 | 712/227 |
| 2009/0138670 A1* | 5/2009 | Mutlu | G06F 13/1663 | 711/167 |
| 2010/0115168 A1* | 5/2010 | Bekooij | G06F 9/48 | 710/244 |
| 2011/0093857 A1* | 4/2011 | Sydow | G06F 9/3851 | 718/102 |
| 2011/0161294 A1* | 6/2011 | Vengerov | G06F 17/30581 | 707/637 |
| 2011/0161943 A1* | 6/2011 | Bellows | G06F 9/4843 | 717/149 |
| 2011/0161976 A1* | 6/2011 | Alexander | G06F 9/5066 | 718/104 |
| 2011/0252411 A1* | 10/2011 | Martin | G06F 8/456 | 717/149 |
| 2012/0084774 A1* | 4/2012 | Post | G06F 9/5088 | 718/1 |
| 2012/0180068 A1* | 7/2012 | Wein | G06F 9/4881 | 718/106 |
| 2013/0151879 A1* | 6/2013 | Thomson | G06F 1/329 | 713/322 |
| 2014/0173623 A1* | 6/2014 | Chang | G06F 9/5088 | 718/105 |
| 2014/0282565 A1* | 9/2014 | Jaleel | G06F 9/5044 | 718/102 |
| 2014/0359632 A1* | 12/2014 | Kishan | G06F 9/4881 | 718/103 |
| 2015/0067700 A1* | 3/2015 | Kim | G06F 9/46 | 718/107 |
| 2015/0281110 A1* | 10/2015 | Chow | H04L 47/70 | 709/226 |
| 2016/0077874 A1* | 3/2016 | Govindarajeswaran | G06F 9/4881 | 718/102 |
| 2016/0171390 A1* | 6/2016 | Mohammad Mirzaei | G06F 11/3438 | 706/12 |
| 2017/0024316 A1* | 1/2017 | Park | G06F 12/0815 | |

OTHER PUBLICATIONS

GCN_Architecture whitepaper, 2012, AMD, (Year: 2012).*

Pelley, Steven et al., "Memory Persistency," Proceeding of the 41st Annual International Symposium on Computer Architecture, ISCA '14, 2014, pp. 265-276, IEEE Press, Piscataway, NJ, USA.

Condit, Jeremy et al., "Better I/O Through Byte-Addressable, Persistent Memory," Proceedings of the 22nd ACM Symposium on Operating Systems Principles, SOSP '09, Oct. 11-14, 2009, pp. 133-146, ACM, Big Sky, MT, USA.

Joshi, Arpit et al., "Efficient Persist Barriers for Multicores," Proceedings of the 48th Annual International Symposium on Microarchitecture, MICRO '15, Dec. 5-9, 2015, pp. 660-671, ACM, Waikiki, HI, USA.

Hower, Derek R. et al., "Heterogeneous-race-free Memory Models," Proceedings of the 19th International Conference on Architectural Support for Programming Languages and Operating Systems, ASPLOS '14, Mar. 1-4, 2014, pp. 427-440, ACM, Salt Lake City, UT, USA.

* cited by examiner

MULTI-PROCESSOR APPARATUS AND METHOD OF DETECTION AND ACCELERATION OF LAGGING TASKS

BACKGROUND

Conventional computer architectures include processing devices with multiple processors configured to process sequences of programmed instructions such as threads of a program. The processors can be used to process tasks in parallel with other tasks of the program. During processing of the programs, amounts of parallel work (e.g., number of parallel tasks, amount of time to process parallel tasks, number of cycles to process parallel tasks) can vary over different portions or phases of the program. Processing delays, (e.g., delays in execution of a program) of one or more of these tasks can delay the execution of the program, negatively impacting performance.

BRIEF DESCRIPTION OF THE DRAWINGS

A more detailed understanding can be had from the following description, given by way of example in conjunction with the accompanying drawings wherein.

DETAILED DESCRIPTION

Figure 1:
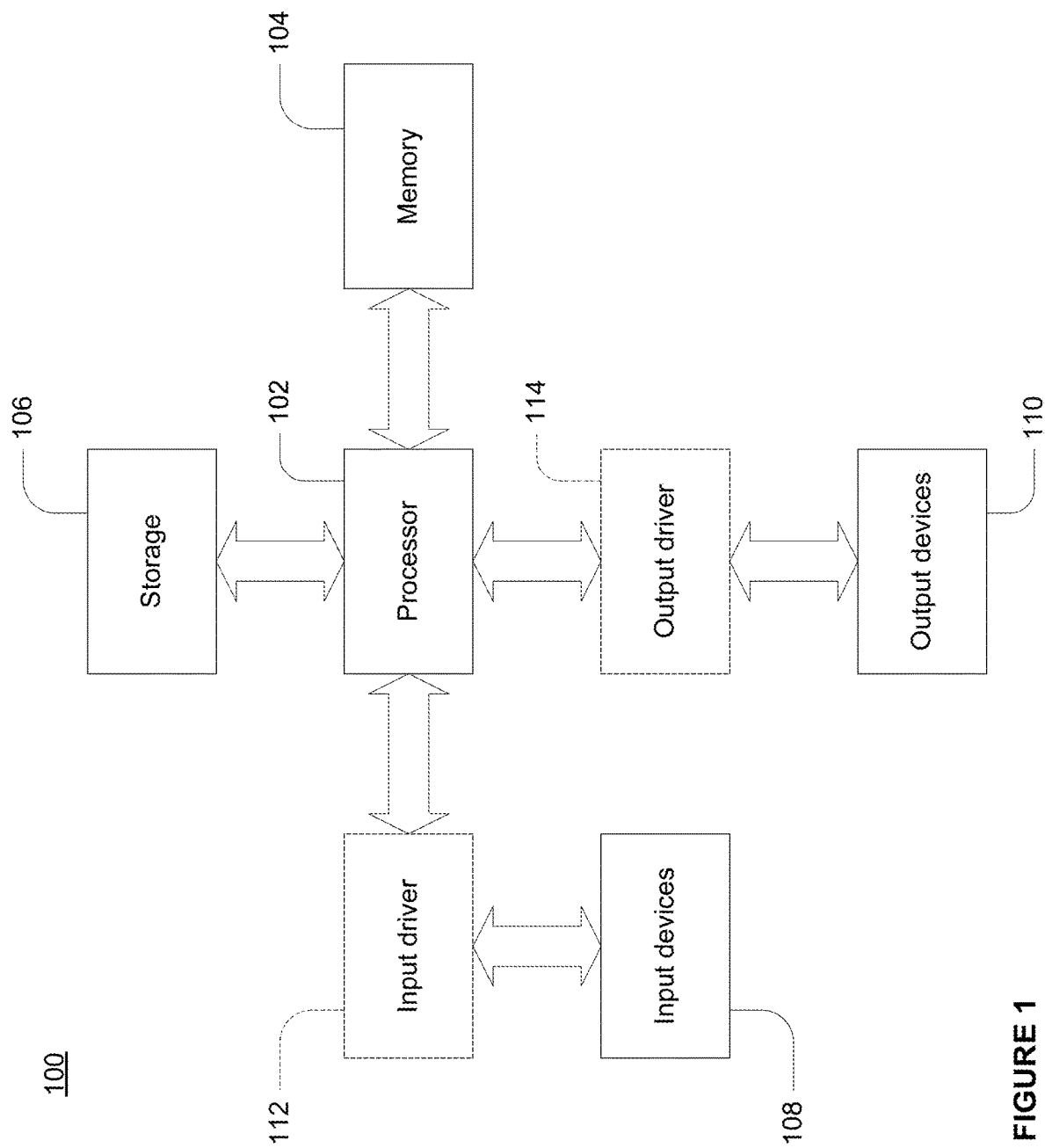
FIG. 1 is a block diagram of an example device in which lagging task determination and accelerated lagging task execution is implemented.

As used herein, a portion of program includes any sequence of instructions executed by a processing apparatus comprising one or more processors (e.g., CPU, GPU) to perform operations, computations, functions, processes, jobs and the like. A sequence of program instructions can include one or more tasks, threads, work-items, task-groups, thread-groups and work-groups (e.g., wavefronts) and kernels. These terms are, however, merely exemplary and not exhaustive. For simplified explanation purposes the term task is used herein to denote any sequence of program instructions, such as threads, work-items, work-groups (e.g., wavefronts) and kernels.

As used herein, processing of tasks comprises one or more of a plurality of processing stages (e.g., stages of an instruction pipeline), such as but not limited to fetching, decoding, and executing tasks of a program.

During processing of a program, when a task lags behind (e.g., takes longer to complete execution) other tasks due to various factors (e.g., complex branching behavior, an irregular memory access pattern, and/or an unpredictable amount of work), one or more of the other tasks can be caused to wait for the lagging task to complete execution, such as tasks which have completed other processing stages (e.g., fetch and decode stages) but cannot execute because they are dependent on data resulting from the execution of the lagging task. One or more of these lagging tasks can bottleneck the execution of a program and, therefore, delay the execution of the program.

Some programs include lagging tasks which cause different amounts of delays to the execution of other tasks. Further, a lagging task can cause delays to execution of other tasks in one program portion or phase, but not in another program portion or phase. Examples of such programs include neural network programs, clustering programs and graph search/traversal programs having dimensional changes.

A processing apparatus is provided that comprises a plurality of processors comprising a plurality of processor types, each of the plurality of processors configured to process a plurality of tasks of a program. The apparatus also comprises a controller configured to determine, from the plurality of tasks being processed by the plurality of processors, a task being processed on a first processor of a first processor type to be a lagging task causing a delay in execution of one or more other tasks of the plurality of tasks. The controller is also configured to provide, to a second processor of a second processor type, the determined lagging task to be executed by the second processor.

The second processor can be configured to complete execution of the determined lagging task faster than the first processor.

The controller can be further configured to dynamically determine, at runtime, the task being processed on the first processor as the lagging task.

The controller can be further configured to determine the task being processed on the first processor as the lagging task by comparing an execution time of the task being processed on the first processor to execution times of each or a portion of the plurality of tasks and identifying the task being processed on the first processor as the lagging task when the execution time of the task is greater than the execution times of each or the portion of the plurality of tasks when a sampling period has elapsed.

The controller can be further configured to determine the task being processed on the first processor as the lagging task by comparing an execution time of the task being processed on the first processor to an average execution time of each or a portion of the plurality of tasks' execution times and identifying the task being processed on the first processor as the lagging task when the execution time of the task is greater than an average execution time of each or the portion of the plurality of tasks' execution times when a sampling period has elapsed.

The controller can be further configured to determine the task being processed on the first processor as the lagging task by comparing an execution time of the task being processed on the first processor to a threshold execution time and identify the task being processed on the first processor as the lagging task when the execution time of the task is equal to or greater than the threshold execution time when a sampling period has elapsed.

The processing apparatus can further comprise a counter configured to indicate a number of stalls for each of the plurality of tasks, each stall occurring when a corresponding task does not complete execution when a time interval has elapsed. The controller can be further configured to determine the task being processed on the first processor as the lagging task by comparing a stall count of the task being processed on the first processor to stall counts for each or a portion of a plurality of tasks and identifying the stall count of the task being processed on the first processor as the lagging task when the stall count of the task is beyond the stall counts for each or the portion of the plurality of tasks when a sampling period has elapsed.

The controller can be further configured to determine the task being processed on the first processor as the lagging task by comparing a stall count of the task being processed on the first processor to an average stall count of each or a portion of the plurality of tasks' stall counts and identifying the stall count of the task being processed on the first processor as the lagging task when the stall count of the task is beyond an average stall count each or the portion of the plurality of tasks' stall counts when a sampling period has elapsed.

The controller can be further configured to determine the task being processed on the first processor as the lagging task by comparing a stall count of the task being processed on the first processor to a threshold stall count and identifying the task being processed on the first processor as the lagging task when the stall count of the task is beyond the threshold stall count when a sampling period has elapsed.

The controller can be further configured to determine a delay level of a plurality of delay levels for the lagging task. Each of the plurality of delay levels corresponds to a range of amounts of delay caused to execution of other tasks of the plurality of tasks. The controller is further configured to determine the task being processed on the first processor as the lagging task to be executed by the second processor based on a delay level of the lagging task.

The processing apparatus can further comprise a dedicated bus connected between the first processor and the second processor and configured to transfer lagging tasks between the first processor and the second processor.

One or more of the plurality of processors can comprise non-uniform GPU cores each having a plurality of lanes, in which one or more first lanes of a first type are configured to execute the determined lagging task faster than one or more second lanes of a second type are configured to execute the determined lagging task.

The first processor of the first type can be a GPU and the second processor of the second type can be a CPU and the controller is configured to provide the determined lagging task from the GPU to the CPU to be executed.

A method of accelerating program processing is provided that comprises allocating, to a plurality of processors comprising a plurality of processor types, a plurality of tasks of a program for processing. The method also comprises determining, from the plurality of tasks being processed by the plurality of processors, a task being processed on a first processor of a first processor type to be a lagging task causing a delay in execution of one or more other tasks of the plurality of tasks. The method further comprises providing the determined lagging task to a second processor of a second processor type to be executed by the second processor.

The method can further comprise dynamically determining, at runtime, the task processing on the first processor as the lagging task.

The method can further comprise determining the task processing on the first processor as the lagging task by comparing an execution time of the task processing on the first processor to execution times of each or a portion of the plurality of tasks and identifying the task being processed on the first processor as the lagging task when the execution time of the task is greater than the execution times of each or the portion of the plurality of tasks when a sampling period has elapsed.

The method can further comprise determining the task processing on the first processor as the lagging task by comparing an execution time of the task processing on the first processor to an average execution time of each or a portion of the plurality of tasks' execution times and identifying the task being processed on the first processor as the lagging task when the execution time of the task is greater than an average execution time of each or the portion of the plurality of tasks' execution times when a sampling period has elapsed.

The method can further comprise receiving an indication of a number of stalls for each of the plurality of tasks. Each stall occurs when a corresponding task does not complete execution when a time interval has elapsed. The task processing on the first processor can be determined as the lagging task by comparing a stall count of the task processing on the first processor to stall counts for each or a portion of a plurality of tasks and identifying the stall count of the task as the lagging task when the stall count of the task is beyond the stall counts for each or the portion of the plurality of tasks when a sampling period has elapsed.

The task processing on the first processor can be determined as the lagging task by comparing a stall count of the task processing on the first processor to a threshold stall count and identifying the task being processed on the first processor as the lagging task when the stall count of the task is beyond the threshold stall count when a sampling period has elapsed A tangible, non-transitory computer readable medium is provided that comprises instructions for causing a computer to execute instructions of a method of accelerating program processing. The instructions comprise allocating, to a plurality of processors comprising a plurality of processor types, a plurality of tasks of a program for processing. The instructions also comprise determining, from the plurality of tasks being processed by the plurality of processors, a task being processed on a first processor of a first processor type to be a lagging task causing a delay in execution of one or more other tasks of the plurality of tasks. The instructions further comprise providing the determined lagging task to a second processor of a second processor type to be executed by the second processor.

FIG. 1 is a block diagram of an exemplary device 100. The device 100 can include, for example, a computer, a gaming device, a handheld device, a set-top box, a television, a mobile phone, or a tablet computer. The device 100 includes a processor 102, memory 104, a storage 106, one or more input devices 108, and one or more output devices 110. The device 100 can also include an input driver 112 and an output driver 114. It is understood that the device 100 can include additional components not shown in FIG. 1.

The processor 102 can include a CPU, a GPU, a CPU and GPU located on the same die, or one or more processor cores, wherein each processor core can be a CPU or a GPU. Memory 104 can be located on the same die as the processor 102, or can be located separately from the processor 102. Memory 104 can include a volatile or non-volatile memory, for example, random access memory (RAM), dynamic RAM, or a cache.

The storage 106 can include a fixed or removable storage, for example, a hard disk drive, a solid state drive, an optical disk, or a flash drive. The input devices 108 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 can include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
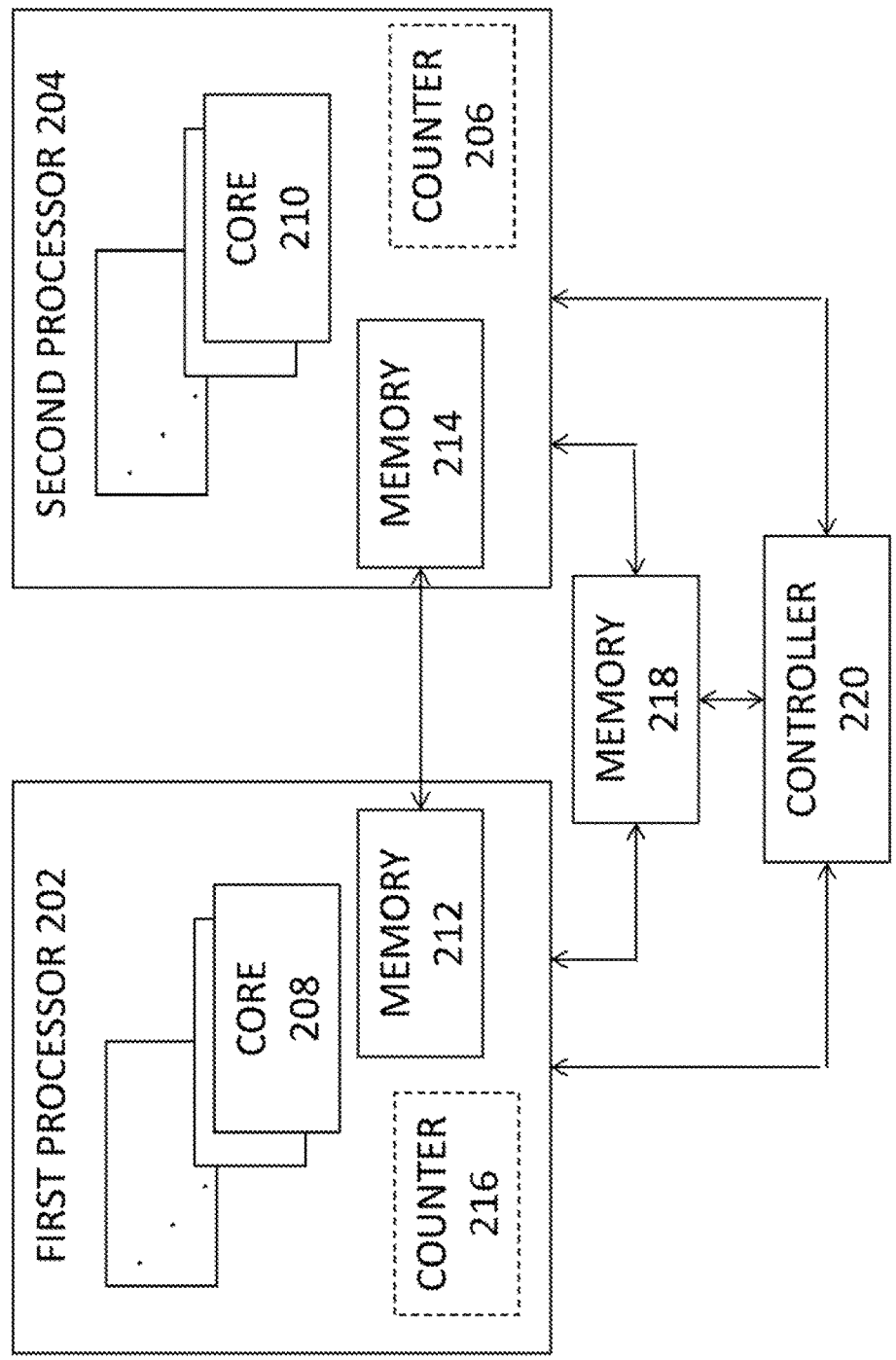
FIG. 2 is a block diagram illustrating exemplary processing apparatus components used to determine lagging tasks and accelerate execution of lagging tasks.

FIG. 2 is a block diagram illustrating exemplary components of a processing apparatus 200 used to determine lagging tasks and accelerate execution of the lagging tasks. Each of the components shown in FIG. 2 can be part of the exemplary processor 102 shown in FIG. 1. As shown in FIG. 2, processing apparatus 200 comprises a first processor 202 of a first processor type (e.g., GPU) and a second processor 204 of a second processor type (e.g., CPU). First processor 202 includes processor cores 208, a counter 216 and memory portion 212, which is shared by any number of the processor cores 208. Second processor 202 includes processor cores 210, counter 206 and memory portion 214, which is shared by any number of the processor cores 210. Processing apparatus 200 also comprises shared memory portion 218, which is shared by first processor 202 and second processor 204. The shared memory 218 can include a unified address array to transfer lagging tasks between any number of processors (e.g., via a pointer to the shared memory). The number of processors, processor cores, counters and memory portions shown in FIG. 2 is merely exemplary.

Processing apparatus 200 also includes controller 220, which is in communication with first processor 202 (and any of its components), second processor 204 (and any of its components) and memory portion 218. Controller 220 can also be in communication with other memory portions (not shown). Controller 220 is configured to determine lagging tasks and accelerate execution of lagging tasks by causing the determined lagging tasks to move between processors. As used herein, a processor can be first processor 202, second processor 204, processor cores 208 and processor cores 210. Accordingly, lagging tasks can be caused to move between first processor 202 and second processor 204, between processor cores 208 of first processor 202 and between processor cores 210 of second processor 204. Controller 220 is configured to receive and compare data (e.g., task execution times, task stall counts) to determine lagging tasks. Controller 220 is configured to cause the determined lagging tasks to move between processors by scheduling (or causing a scheduler (not shown) in communication with the controller 220) the lagging tasks for processing by any number of processors.

Figure 3:
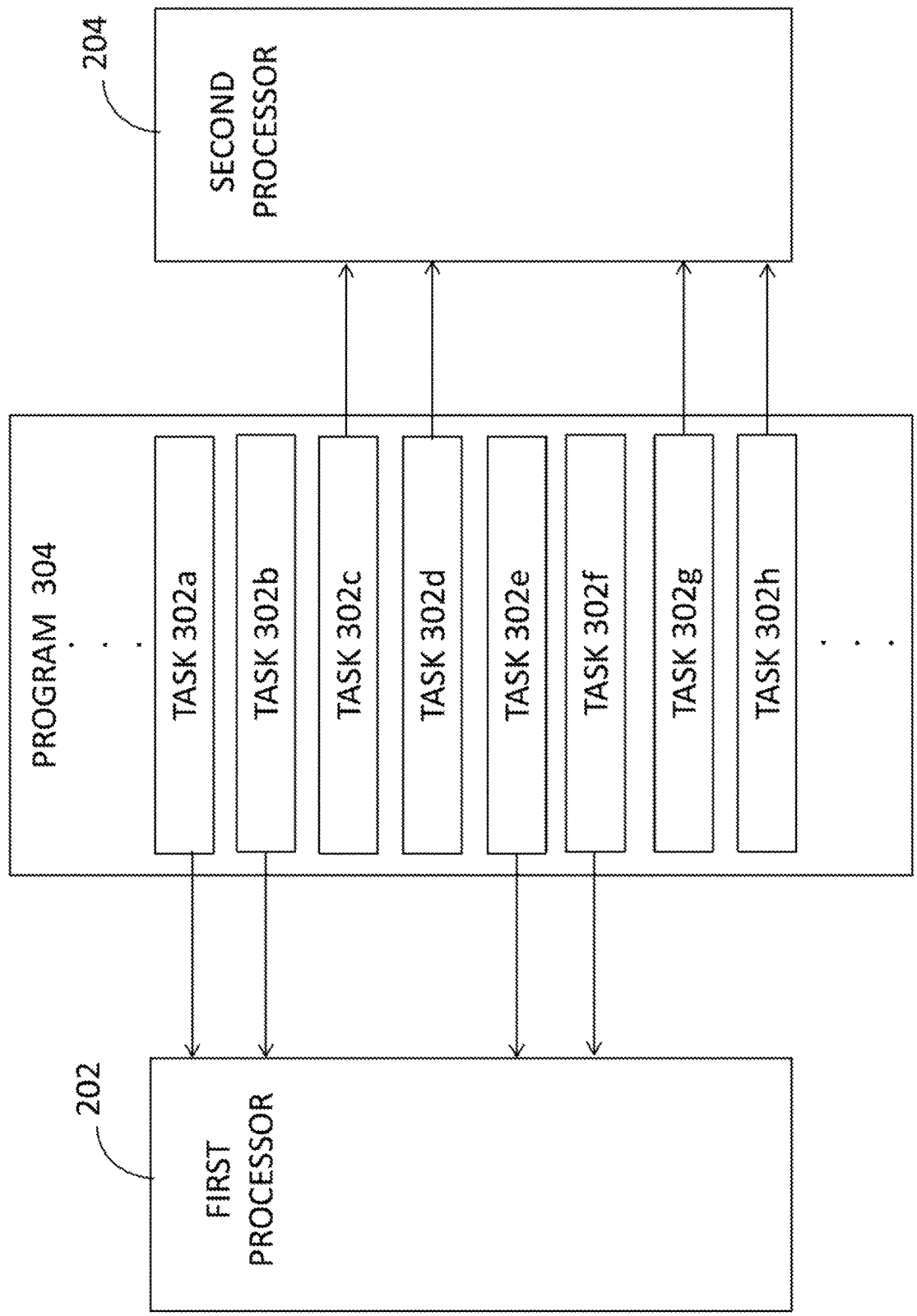
FIG. 3 is a diagram illustrating exemplary task allocation to different processors.

FIG. 3 is a diagram illustrating exemplary task allocation to different processors. The tasks 302 comprise a portion (e.g., sequence of programmed tasks) of a program 304 and can be allocated (e.g., scheduled) to the first processor 202 and the second processor 204 (shown in FIG. 2) for processing. As shown in FIG. 3, tasks 302a, 302b, 302e and 302f are allocated to first processor 202 while tasks 302c, 302d, 302g and 302h are allocated to second processor 204. The number of tasks 302 and the order in which the tasks 302 are allocated to first processor 202 and second processor 204 in FIG. 3 is merely exemplary.

One or more tasks (e.g., one or more of tasks 302a through 302h) are determined to be lagging tasks when they cause a delay in execution of one or more other tasks (e.g., other of tasks 302a through 302h), which can occur due to, for example, a longer latency time (e.g., time to complete execution) for the lagging tasks than the one or more other tasks which delays completion of a program.

Figure 4:
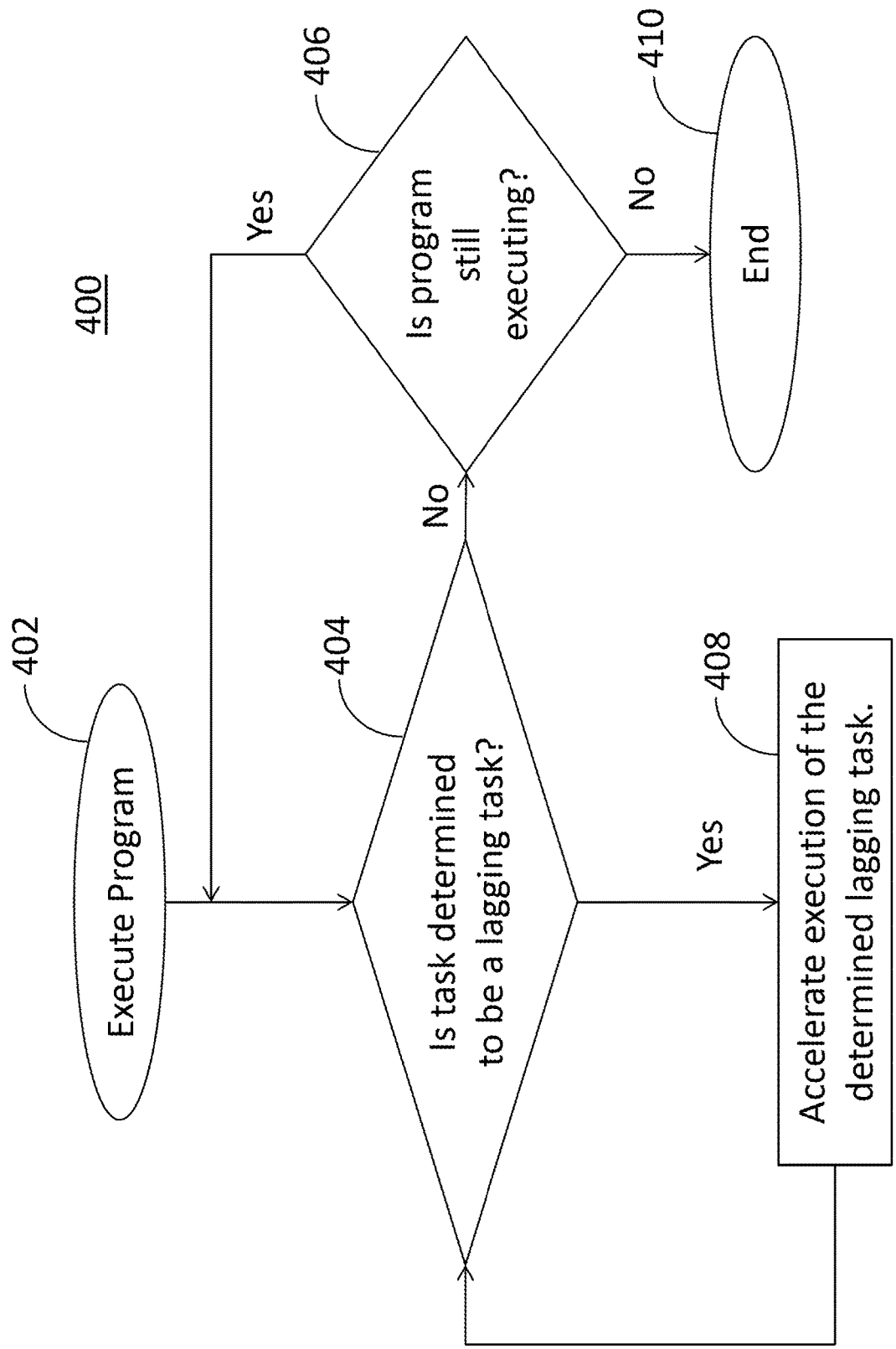
FIG. 4 is a flow diagram illustrating an exemplary method of accelerating program processing using lagging thread determination.

FIG. 4 is a flow diagram illustrating an exemplary method 400 of accelerating program processing using lagging task detection. As shown at block 402 of the method 400 in FIG. 4, the program executes (e.g., executes at the beginning of a program, resumes execution at a portion after the beginning of the program).

As shown at decision block 404 in FIG. 4, the method 400 includes determining, whether a task is a lagging task causing a delay in execution of one or more other tasks.

For example, a decision is made as to whether one of the tasks 302a to 302h in FIG. 3 being processed by processor 202 and 204 is a lagging task causing a delay in execution of one or more of the other tasks 302a to 302h.

Lagging task determination includes dynamically determining a lagging task at runtime using one or more metrics recorded as performance counters visible to hardware components. The performance counters can also be utilized by software programs (e.g., programs that support self-modifying or software-controlled task migration and hardware configuration, such as frequency changes). Dynamic determination of lagging tasks includes using one or more dynamic components such as: determination using scoring techniques (e.g., comparing task stall counts, comparing task execution times); determination based on types of actions being requested or processed (e.g., accessing data using a slower process, such as accessing data from a slower memory); determination based on task descheduling (e.g., when descheduling occurs due to a latency operation (e.g., greater than a latency threshold), tasks determined to cause the descheduling are determined to be a lagging tasks); and determination based on monitoring lagging tasks at a synchronization point (e.g., point at which a number of tasks completes before moving to a next portion of a program), such as determining tasks of one or more groups as lagging tasks when it is determined that the one or more groups are waiting for one or more other groups to complete execution at the synchronization point.

Scoring techniques include comparing an execution time of a task to a plurality of task execution times or a threshold execution time. For example, a task can be determined to be lagging when at least one of: a task's execution time (e.g., time to complete execution) is greater than execution times for each or a portion (e.g., percentage, fraction, ratio) of a plurality of tasks (e.g., other tasks of a portion of a program); a task's execution time is greater than an average execution time of each or a portion of the plurality of tasks' execution times; and a task's execution time is equal to or greater than a threshold execution time (e.g., a time over the average execution time of each or a portion of the plurality of tasks). For example, a clock (not shown) indicates whether each of a plurality of tasks has completed execution for each interval (e.g., one or more clock cycles) of a plurality of intervals that make up a sampling period. When the sampling period has completed, the execution times for each of the plurality of tasks is determined. One or more tasks having longer execution times are compared to each or a portion of the other tasks execution times, the average execution time of each or the portion of the plurality of tasks' execution times, or the threshold execution time to determine whether the one or more tasks having longer execution times are lagging tasks.

Scoring techniques also include monitoring stall counts for each stall (e.g., task does not execute at each clock cycle)

of a plurality of tasks to indicate whether one or more tasks are waiting for a particular task to complete execution when a time interval (e.g., clock cycle) has elapsed. The particular task can be determined as a lagging task when its stall count (e.g., count for each cycle or a plurality of cycles) for a sampling period is beyond (e.g., less than when incrementing stall counts or greater than when decrementing stall counts) stall counts for each or a portion of a plurality of tasks. The particular task can also be determined as a lagging task when its stall count is beyond an average stall count of a plurality of tasks or a threshold stall count (e.g., a predetermined amount beyond the average stall count). One or more counter are used to indicate a number of stalls for each of the plurality of tasks. Stall counts can also be used to identify delay levels of lagging tasks corresponding to amounts of delay caused by the lagging tasks to the execution of other tasks.

Lagging task determination also includes determining the task being processed on the first processor 202 as the lagging task to be executed by the second processor 204 based on a delay level of the lagging task.

Figure 5:
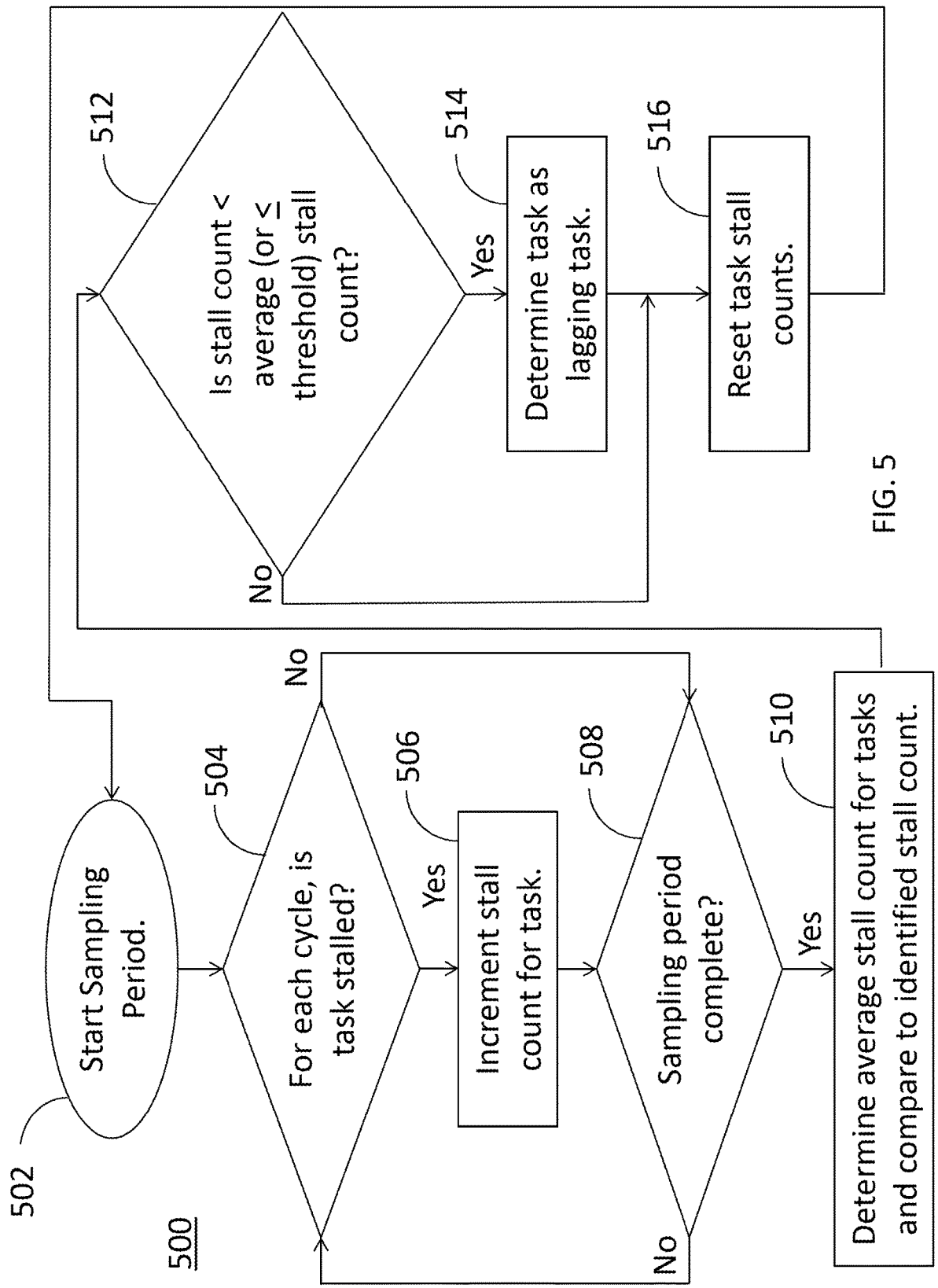
FIG. 5 is a flow diagram illustrating an exemplary method of determining lagging tasks using a stall count scoring technique.

FIG. 5 is a flow diagram illustrating an exemplary method 500 of determining lagging tasks using a stall count scoring technique. Tasks 302a to 302h shown in FIG. 3 are used to illustrate the method. Any number of tasks, however, can be used to determine whether a task is a lagging tasks causing delay in the execution of other tasks.

As shown in FIG. 5, a sampling period (e.g., a plurality of clock cycles) is started at 502 of method 500. As shown at decision block 504 of method 500, the method includes determining whether a task is stalled for each cycle. A clock (not shown) can be used to identify each cycle. In the exemplary method shown in FIG. 3, a stall is determined when the task 302c does not execute (e.g., due to a data dependence) at each clock cycle. For example, task 302c can be monitored at each clock cycle to determine when task 302c is stalled at each clock cycle.

As shown at block 506, a stall count is incremented when the task 302c is determined to be stalled for each cycle. For example, counter 206 of second processor 204 (shown in FIG. 2) is used to monitor the delays of task 302c by incrementing the count for a stall by task 302c at each cycle. The method then proceeds to decision block 508 to determine whether the sampling period is complete. When the task 302c is determined to not be stalled, the stall count for task 302c is not incremented and the method proceeds to decision block 508 to determine whether the sampling period is complete.

Although the exemplary method illustrated at FIG. 5 determines stalls of tasks at each clock cycle, stalls can be determined and stall counts can be incremented at other intervals, such as any number of clock cycles.

When it is determined, at block 508, that the sampling period for task 302c is not completed, the method returns to decision block 504. When it is determined, at block 508, that the sampling period for task 302c is completed, the stall count for the monitored task 302c task is identified.

As shown at block 510 of FIG. 5, an average stall count is determined from the stall counts of a plurality of tasks compared to the identified stall count of task. For example, the average stall count can be determined from stall counts of the tasks, such as the other tasks (e.g., 302a, 302b and 302d to 302h) or any portion of the tasks. The average stall count is then compared to the identified stall count of task 302c.

When tasks are processed in parallel, the stall count for each task can be identified by monitoring the stall count for a single task. For example, one or more counters (e.g., counter 206 and 216) can identify the stall count for each of the tasks 302a to 302h by monitoring the stall count for a single task (e.g., 302c). A plurality of tasks can also be determined to be lagging tasks at the end of a sampling period.

At decision block 512, the method includes determining whether the identified stall count of task 302c is less than the average stall count or less than or equal to a predetermined threshold stall count. The predetermined threshold stall count can be a count that is a predetermined amount less than the average stall count. When the identified stall count of task 302c is less than the average stall count (or predetermined stall count threshold), indicating that the other tasks are waiting (e.g., due to data dependence) for task 302c to execute, task 302c is determined to be a lagging task at block 514.

Alternatively, counters can be decremented each time a task is determined to be stalled. A task is then determined to be lagging when its stall count is greater than an average stall count or greater than or equal to a predetermined threshold stall count.

Task stall counts are reset, as shown at block 516 (e.g., reset upon the occurrence of an event, such as when a lagging task is determined; reset periodically, at equal or unequal intervals; reset upon demand, such as upon user request).

Additionally or alternatively, determination of one or more lagging tasks includes static determination via one or more static components which utilize user-assisted and/or offline techniques. Static components include pragmas that identify portions of code likely to cause lagging tasks and lagging paths which include a plurality of lagging tasks; conditions that facilitate identification of lagging task behavior; profiling mechanisms that compute statistics about one or more lagging tasks and changes to the lagging tasks over time; or any other component that utilizes user-assisted and/or offline techniques. Static components indicate to the hardware about locality of lagging tasks in the program. For example, indications are passed to the hardware via an architected register or context of the application.

Referring back to FIG. 4, when a lagging task is not detected, it is determined, at decision block 406 whether the program is still executing. When the program is determined to be no longer executing, the method 400 ends at 410. When the program is determined to be executing, the method 400 proceeds back to decision block 404 to determine whether one or more lagging tasks are detected.

When one or more tasks, executing on a processor of a first type (e.g., GPU), is determined to be a lagging task, the execution of the lagging tasks is accelerated at block 408 by moving the lagging task from the processor of the first type) to a processor of a second type (e.g., CPU). The lagging task can be moved between processors using a dedicated high bandwidth bus connected between processors. The lagging task can be moved to a processor predetermined (e.g., a processor dedicated to processing lagging tasks) or predicted (e.g., based on past performance) to complete execution of the task faster than the first processor or moved to another processor without such determination or prediction. The lagging task can also be moved to a particular processor based on a task's level of delay.

Exemplary processing apparatuses can be configured to facilitate efficient acceleration of lagging tasks using one or more non-uniform processors, such as processors with non-uniform processing portions (e.g., SIMD cores). For example, one or more of a plurality of lanes (e.g., in each SIMD vector unit (VU) can be configured to process a task faster (e.g., process tasks at a higher frequency) than other lanes of the VU. Lagging tasks can then be moved to a lane (of the same VU or another VU) configured to process a task faster than other lanes.

Exemplary processing apparatuses can be configured to facilitate efficient acceleration of lagging tasks using heterogeneous cores (i.e., heterogeneous GPU cores) in a processor, such as a GPU configured to uniformly distribute CPU cores among vector units in the GPU (e.g., a CPU core paired with a SIMD GPU core) and access (e.g., directly or via local high-bandwidth links) vector general purpose registers (GPRs) of a GPU. A portion of memory associated with the GPU (e.g., GPU cache) can be allocated to scalar type data.

Exemplary processing apparatuses can include heterogeneous memories, in which a portion of memory configured to facilitate accelerated execution of tasks (e.g., SRAM, RLDRAM, 3D-stacked or DDR4 DRAM) is allocated to store data for determined lagging tasks causing delay in execution of one or more other tasks (e.g., when a number of memory stall counts of a lagging task is greater than or equal to a memory stall count threshold).

Exemplary processing apparatuses can be configured to facilitate efficient acceleration of lagging tasks using a memory controller scheduler configured to allocate higher priority to lagging tasks; hardware configured to remap a table that temporarily re-maps blocks of data for lagging tasks into a memory (e.g., low-latency SRAM or a scratchpad memory); one or more per-task hardware caches allocated for lagging tasks (e.g., at the runtime through dynamic partitioning of the cache space by allowing larger fraction of cache space for lagging tasks); a memory management controller configured to perform address translation on behalf of the IO device; dedicated translation lookaside buffers (TLBs) configured to receive and retain lagging tasks incurring longer latencies than one or more other tasks. Address translation entries associated with the lagging tasks can be retained in a TLB for longer periods of time than other tasks, postponing or preventing eviction of the lagging tasks which would otherwise cause performance loss due to longer search times (e.g., page table walks).

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements accelerating program processing.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing apparatus comprising:
    a plurality of processors comprising a plurality of processor types, each of the plurality of processors configured to process a plurality of tasks of a program; and
    a counter configured to indicate a number of stalls for each task, each stall occurring when a corresponding task does not complete execution at the elapse of one of a plurality of intervals of a sampling period;
    a controller configured to:
    monitor, during the sampling period, stall counts for each of the plurality of tasks;
    determine, from the plurality of tasks being executed by the plurality of processors, a task of the program executing on a first processor of a first processor type to be a lagging task causing a delay in execution of one or more of a plurality of other tasks of the program executing on at least one of the first processor and a second processor of a second processor type by identifying a stall count of the task executing on the first processor as the lagging task when the stall count of the task executing on the first processor is beyond an average stall count which includes stall counts of the one or more other tasks, the second processor of the second processor type being determined, prior to runtime, to execute each of the plurality of tasks determined to be lagging tasks;
    provide, to the second processor of the second processor type for execution, the task executing on the first processor determined to be the lagging task; and
    execute the lagging task on the second processor.

2. The processing apparatus of claim 1, wherein the second processor is configured to complete execution of the determined lagging task faster than the first processor.

3. The processing apparatus of claim 1, wherein the controller is further configured to dynamically determine, at runtime, the task executing on the first processor as the lagging task.

4. The processing apparatus of claim 1, wherein the controller is further configured to determine the task executing on the first processor as the lagging task by:
    when a predetermined sampling period is completed, comparing an execution time of the task executing on the first processor during the sampling period to execution times of one or more other tasks executing on the at least one of the first processor and the second processor during the sampling period; and
    identifying the task executing on the first processor as the lagging task when the execution time of the task executing on the first processor is greater than the execution times of the one or more other tasks.

5. The processing apparatus of claim 1, wherein the controller is further configured to determine the task executing on the first processor as the lagging task by:
    when a predetermined sampling period is completed, comparing an execution time of the task executing on the first processor during the sampling period to an average execution time of one or more other tasks executing on the at least one of the first processor and the second processor during the sampling period; and identifying the task executing on the first processor as the lagging task when the execution time of the task executing on the first processor is greater than the average execution time.

6. The processing apparatus of claim 1, wherein the controller is further configured to determine the task executing on the first processor as the lagging task by:

when a predetermined sampling period is completed, comparing an execution time of the task executing on the first processor during a sampling period to a threshold execution time; and identifying the task executing on the first processor as the lagging task when the execution time of the task executing on the first processor is equal to or greater than the threshold execution time.

7. The processing apparatus of claim 1, wherein the controller is further configured to:

determine a delay level of a plurality of delay levels for the lagging task, each of the plurality of delay levels corresponding to a range of amounts of delay caused to execution of other tasks of the plurality of tasks;

determine the task executing on the first processor as the lagging task to be executed by the second processor based on the delay level of the lagging task.

8. The processing apparatus of claim 1, further comprising a dedicated bus connected between the first processor and the second processor and configured to transfer lagging tasks between the first processor and the second processor.

9. The processing apparatus of claim 1, wherein one or more of the plurality of processors comprise non-uniform GPU cores each having a plurality of lanes, in which one or more first lanes of a first type are configured to execute the determined lagging task faster than one or more second lanes of a second type are configured to execute the determined lagging task.

10. The processing apparatus of claim 1, wherein the first processor of the first type is a GPU and the second processor of the second type is a CPU and the controller is configured to provide, the determined lagging task from the GPU to the CPU to be executed.

11. A method of accelerating program processing, the method comprising:

allocating, to a plurality of processors comprising a plurality of processor types, a plurality of tasks of a program for execution;

monitoring, via a counter, stall counts for each of the plurality of tasks, each stall occurring when a corresponding task does not complete execution at the elapse of one of a plurality of intervals of a sampling period;

determining, from the plurality of tasks executing on the plurality of processors, a task of the program executing on a first processor of a first processor type to be a lagging task causing a delay in execution of one or more of a plurality of other tasks of the program executing on at least one of the first processor and a second processor of a second processor type by identifying a stall count of the task executing on the first processor as the lagging task when the stall count of the task executing on the first processor is beyond an average stall count which includes stall counts of the one or more other tasks, the second processor being determined, prior to runtime, to execute tasks determined to be lagging tasks;

providing the determined lagging task to the second processor of the second processor type for execution; and executing the lagging task on the second processor.

12. The method of claim 11, further comprising dynamically determining, at runtime, the task processing on the first processor as the lagging task.

13. The method of claim 11, further comprising determining the task processing on the first processor as the lagging task by:

when a predetermined sampling period is completed, comparing an execution time of the task executing on the first processor during the sampling period to execution times of one or more other tasks executing on the at least one of the first processor and the second processor during the sampling period; and identifying the task executing on the first processor as the lagging task when the execution time of the task executing on the first processor is greater than the execution times of the one or more other tasks.

14. The method of claim 11, further comprising determining the task processing on the first processor as the lagging task by:

when a predetermined sampling period is completed, comparing an execution time of the task executing on the first processor during the sampling period to an average execution time of one or more other tasks executing on the at least one of the first processor and the second processor during the sampling period; and identifying the task executing on the first processor as the lagging task when the execution time of the task executing on the first processor is greater than the average execution time.

15. The method of claim 11, further comprising:

receiving an indication of a number of stalls for each of the plurality of tasks, and when the sampling period is completed, comparing the stall count of the task being processed on the first processor to the stall counts of the one or more other tasks.

16. A tangible, non-transitory computer readable medium comprising instructions for causing a computer to execute instructions of a method of accelerating program processing, the instructions comprising:

allocating, to a plurality of processors comprising a plurality of processor types, a plurality of tasks of a program for execution;

monitoring, via a counter, stall counts for each of the plurality of tasks, each stall occurring when a corresponding task does not complete execution at the elapse of one of a plurality of intervals of a sampling period;

determining, from the plurality of tasks executing on the plurality of processors, a task of the program executing on a first processor of a first processor type to be a lagging task causing a delay in execution of one or more of a plurality of other tasks of the program executing on at least one of the first processor and a second processor of a second processor type by identifying a stall count of the task executing on the first processor as the lagging task when the stall count of the task executing on the first processor is beyond an average stall count which includes the stall counts of one or more other tasks, the second processor being determined, prior to runtime, to execute tasks determined to be lagging tasks;

providing the determined lagging task to the second processor of the second processor type for execution; and executing the lagging task on the second processor.

\* \* \* \* \*